Feb. 16, 1943.  R. W. BAILY  2,311,358
APPARATUS AND METHOD FOR MOLDING CONCRETE
Filed Nov. 25, 1940  2 Sheets-Sheet 1
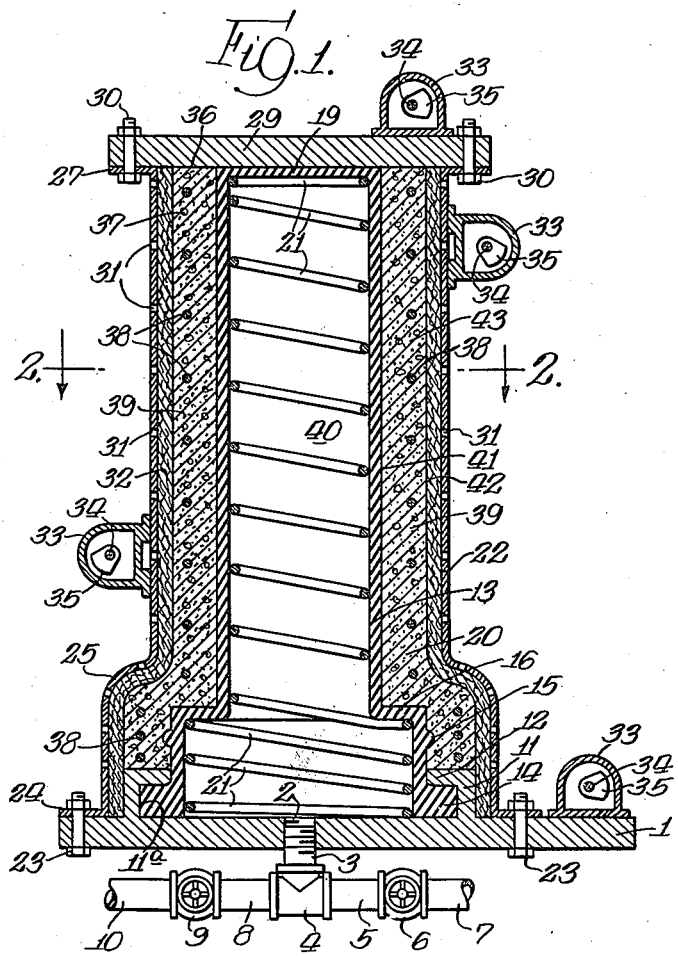
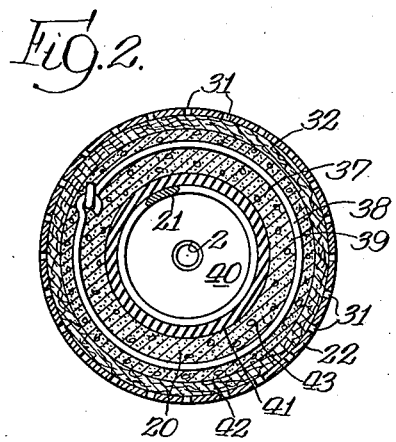
INVENTOR.
Robert William Baily,
BY Bair & Freeman
Attys Feb. 16, 1943.   R. W. BAILY   2,311,358
APPARATUS AND METHOD FOR MOLDING CONCRETE
Filed Nov. 25, 1940   2 Sheets-Sheet 2
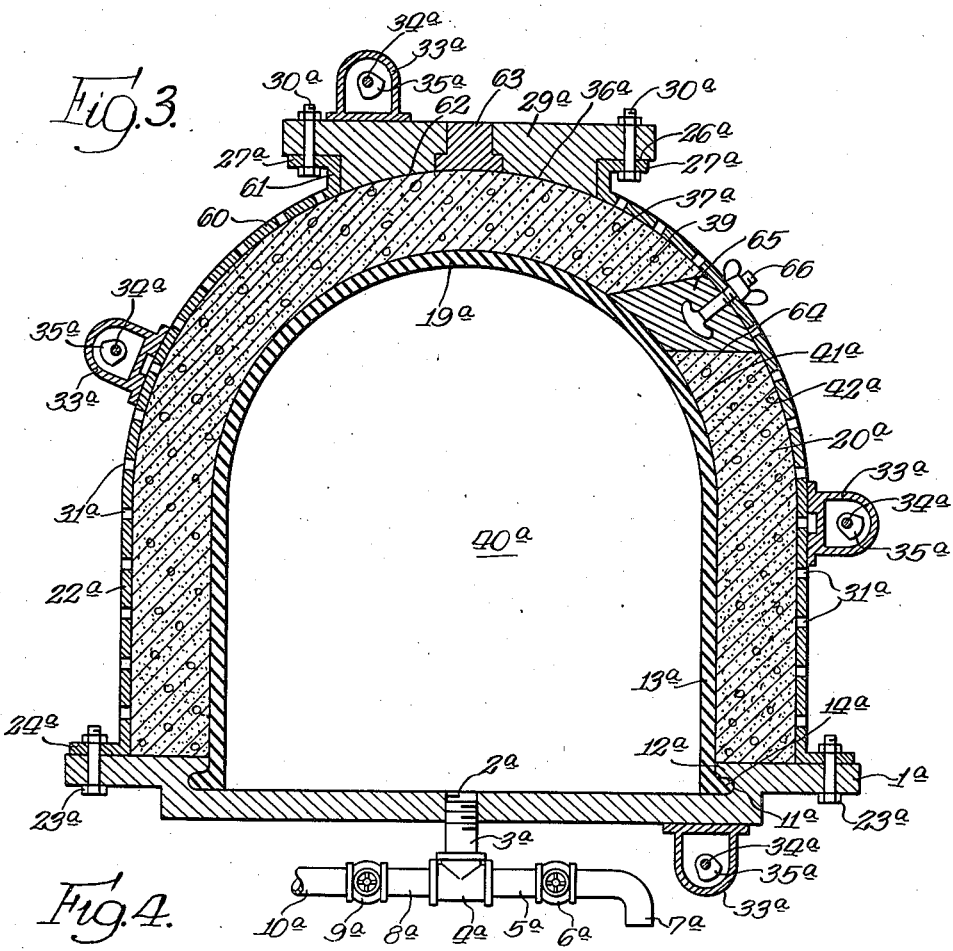
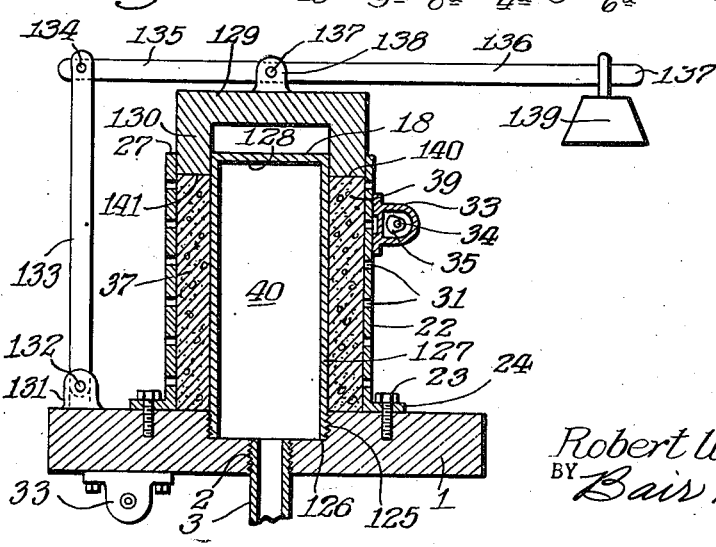
INVENTOR.
Robert William Baily.
BY Bair & Freeman
Attys.

Patented Feb. 16, 1943

2,311,358

UNITED STATES PATENT OFFICE 2,311,358

APPARATUS AND METHOD FOR MOLDING CONCRETE

Robert William Baily, Narberth, Pa.

Application November 25, 1940, Serial No. 367,093

7 Claims. (Cl. 25—130)

My invention comprises a new and useful method and apparatus for treating materials, the particles of which move relatively to each other when subjected to vibration, comprising subjecting the material to vibrations, or pressure, or heat, or any combination thereof, the constituents of the materials including cementitious matter.

One object of my invention is to form objects of various shapes and of various materials in an expeditious and economical manner, to densify and compact the materials so that the objects thus formed may be promptly utilized, and the objects have the maximum density, or strength, or both.

Another object of my invention is to form conduits from materials such, for instance, as Portland cement concrete, in such a manner that these conduits may be used promptly after manufacture for the conveyance of fluids under pressure.

Another object of my invention is to provide a method and apparatus for the quick and economical construction of machine-gun emplacements from materials readily available at the final site of the emplacements; likewise, to provide a method and apparatus for the construction, in situ, of bomb-proof shelters in areas likely to be subjected to the horrors of war, permitting such shelters to be quickly and economically constructed in the minimum of time and at the minimum of expense.

Another object of my invention is to provide method and apparatus for the formation of any desired object of any material which is benefitted during the period of its formation by the application of vibrations, pressure, or heat, or any combinations thereof.

I have found that when forming objects of a material such as Portland cement concrete, the mixture when placed in a mold or form is greatly benefitted by the application of vibrations, pressure, heat, or any combination thereof, in order to compact, and densify the material, to make it stronger, and greatly to shorten the time required from the beginning of mixing the ingredients of the material, to its formation, curing, and placement into service. I have also found that various synthetic materials are rapidly made usable in formed objects, by the application of heat, pressure and vibration to the materials during their formation into useful objects.

I have also found that I can utilize what are ordinarily regarded as inferior ingredients, and quickly form an object of Portland cement concrete entirely adequate for the duty it is to perform, where without the use of my method, such ingredients could not be used.

A material such as Portland cement concrete normally is made up of water, cement, fine aggregate such as sand, and coarse aggregate such as gravel, crushed stone, crushed slag or incinerated earth. These materials are intermingled by conventional means and usually deposited in a form or container of the desired shape, and allowed to remain there until the hydration of the cement is partially completed, the form or container then being removed, and the object set aside for a considerable period of time to allow complete "setting up" of the ingredients. For ordinary concrete mixtures, not treated by my method, it is regarded as good engineering practice to allow the objects to "cure" for periods ranging from 14 to 28 days before placing the objects in service.

With the use of my method, the objects may safely be placed in service within one to three hours after the ingredients are placed in the containers or forms.

I have found that if the material, such as concrete, be subjected to suitable vibrations when in the container or form, the entrapped air and surplus water are expelled. In such a mixture, the water added in the original formula has two functions: first, to provide the water for hydrating the cement, a chemical reaction; and second, to lubricate the material so it can satisfactorily be placed in the container or form and be caused to fill the form completely, with a minimum of manual labor. It is well known, however, that a reduction in the proportion of lubricating water greatly increases the strength and density of the resulting concrete. But without vibration, it is difficult if not impossible to reduce the proportion of lubricating water to a satisfactory percentage and obtain a reasonably dense and strong product. I have found that by the application of vibration to such materials, either internally, or through vibrating the forms, or by surface application, the proportion of lubricating water can be radically reduced.

I have found also that by subjecting the concrete to pressure while it is being vibrated, the density is radically increased and a large proportion of the lubricating water that would otherwise remain in the mixture, is expelled. I have also found that by applying heat to the mixture before or while vibrating it, or both, and subjecting it to pressure, the particles of the mixture move relatively with much greater ease, and also, the heat causes some of the lubricating water to be expelled as vapor and further, thereby, assists in consolidating and densifying the mixture. I have also found that after consolidation and densification has been accomplished to the maximum practicable degree, the continued application of heat greatly expedites the chemical reactions within the mixture, and results in remarkably earlier attainment of the ultimate strength of the concrete or other material.

I have also found that in the manufacture of pipes or conduits from a material like Portland cement concrete, and especially where steel reinforcement is utilized to add strength to the structure, my method greatly improves the resulting object and permits its much earlier use.

In the formation of pipes or conduits of concrete, it is common practice to utilize circumferential steel reinforcement to add strength to the object. Where my method is not used, the resulting pipe is not useful for use in conducting fluids under pressure. It is obvious that when manufactured according to commonplace methods, the steel reinforcement is placed in the form and held in desired position, and the concrete poured into the mold or form, surrounding the reinforcement and forming the pipe. It is also obvious that the steel reinforcement when placed in such a manner, is under no appreciable stress, and unable under such conditions to be of any immediate value in resisting internal pressures in the pipe. When subjected to internal pressure, the walls of the pipe stretch in proportion to the pressure internally applied, and in the case of concrete, which is well known to be a brittle and inelastic material, the stretching progresses so far before the reinforcing steel is able to take over the load, that the walls of concrete crack and become ruptured, permitting the egress and wasteful leakage of the contents being transported therein.

In the construction of machine-gun emplacements in times of international stress or internecine strife, it is obviously important that such structures be promptly usable. Likewise, under such conditions it is impracticable to search about for clean materials meeting the requirements for concrete under normal and peaceful times. I have found that by the use of my method I can utilize, for instance, a sand for the fine aggregate that contains a high proportion of loam, or clay, or vegetable matter, usually regarded as fatal characteristics for concrete, and that I can form objects of extremely high strength and density in a maner both prompt and economical.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a vertical cross-sectional elevation of one form of my apparatus.

Figure 2 is a horizontal sectional view taken on the line 2—2 of Figure 1.

Figure 3 is a vertical cross-sectional view of another form of my apparatus, usable for example, to make a bomb shelter.

Figure 4 is a vertical sectional view of another form of mold apparatus.

In Figure 1 is shown one form of apparatus for practicing my method, including the base plate 1, having the central threaded hole 2 into which I thread the pipe 3 connecting into the fitting 4. Into one side of the fitting 4 is connected the low pressure steam line 5 having the control valve 6 in turn connecting to a source 7 of low-pressure steam. Into the opposite side of the fitting 4 I connect the high-pressure steam line 8 having the control valve 9 in turn connecting to a source 10 of high-pressure steam. On the upper surface of plate 1 I provide the annular ring 11 having at its upper edge the inwardly extending annular flange 12, thereby forming an annular channel 11a between the plate 10 and flange 12. The expansible inner form 13, illustrated as tubular, has an enlarged bell 16 at its lower end, formed with the outwardly extending circumferential flange 14 engaging the groove 11a and separable therefrom, and resting on the plate 1. Form 13 has the closure top 19. Form 13 is preferably made of an elastic expansible material, such as rubber, neoprene, or the like, formed to produce the inner surface of the object I desire to manufacture, such as the bell end pipe 20. To maintain form 13 in normal upright position, and to assist form 13 against collapse from external pressure, I provide the helical spring 21, although form 13 may be sufficiently rigid in itself to maintain its position and normal shape. The material of form 13 is also preferred to be capable of enduring live steam and to have desired heat transfer properties. On the downwardly projecting part of the bell 16 at the lower end of form 13 is an external annular rib 15.

The spaced exterior rigid form 22 may be attached to plate 1 by suitable fastenings such as bolts 23, extending through the fastening flange 24 on its lower bell end 25. The form 22 has at its top the annular outwardly extending flange 27. In the drawings I have shown the top of form 22 level with the top 19 of form 13. A top closure plate 29 is attached to flange 27 by fastenings such as bolts 30. I also provide in form 22 any desired number of perforations 31 of convenient opening. Within form 22 I preferably provide the liner 32 in contact with form 22 and of any desired thickness and inner contour, and perfer to make liner 32 of a material that may or may not be incompressible but still sufficiently porous to permit the passage of air and water and to restrict the passage of measurable particles, such as cement. Liner 32 may be of a material on the order of Celotex, and may be described as a sheet of fibrous material somewhat compactly pressed together, permitting the passage of air and water between the fibres. The material may have any desired degree of hardness, so that it may be incompressible under the action of my apparatus, or may be slightly compressible to any desired degree. Liner 32 may also be a composition of layers of metallic fabric, or nettings, through the interstices of which entrapped air and surplus water may escape to orifices 31. It is understood that I may eliminate the liner 32 if desired.

Attached in any suitable way to plate 1, form 22 and closure plate 29, I provide the vibrator mechanisms 33 having the revolving shafts 34 carrying the out-of-balance weights 35. Shafts 34 are revolved by means not shown.

I construct my apparatus so that it may be easily assembled and disassembled, but have omitted some unessential details relating to mode of assembly, from the drawings.

In practice I assemble all the parts of the apparatus of Figure 1, omitting the closure plate 29, and thus affording an opening 36 between the upper ends of forms 13 and 22.

*Method employing apparatus of Figure 1*

In the space 37 between the forms 13 and 22 I place and properly hold the circumferential reinforcement bars 38. I then fill space 37 with concrete 39 or other suitable material to the top of the forms. Simultaneously I open valve 6 allowing live steam at or slightly above atmospheric pressure, into space 40 within form 13, and operate vibrator mechanisms 33 and may supplement them with internal vibrators not shown, which may be inserted into space 37 from above.

As material 39 is filling the space 37, it is being subjected to vibrations from mechanisms 33 and is simultaneously rapidly increasing in temperature, on account of heat, from the live steam in chamber 40 transmitted through form 13. A large part of the entrapped air and surplus water from material 39 is simultaneously being ejected through the opening 36 at the top of the forms and through orifices 31.

When material 39 reaches the elevation 36 and becomes static, I attach closure plate 29 to flanges 27 by means of fastenings 30, in this manner entirely enclosing material 39. Continuing the action of vibrator mechanisms 33, I now slowly close valve 6 which admits live steam at or about atmospheric pressure, and slowly open valve 9, admitting live steam at high pressure. The temperature of the high pressure steam is much higher than that of the low pressure steam, and the temperature of material 39 is rapidly raised. At the moment of closing valve 6 and opening valve 9, the material 39 had become as dense, airless and free from lubricating water as is possible with ordinary vibrating placement methods, and upon the admission of the high pressure steam to chamber 40, the walls of form 13 begin to expand and to exert pressure upon material 39 in excess of that produced by gravity. Under the influence of the vibrations induced by mechanisms 33, the pressure and heat of the high pressure steam, the particles of the material 39 continue for a time to move relatively about, permitting the ejection of the remaining entrapped air through orifices 31, and in due course of time the increase in temperature of material 39 causes the remaining surplus lubricating water to be ejected as a vapor through orifices 31.

When the reinforcing bars 38 were originally placed in position as indicated in Figures 1 and 2, there was no tension induced in bars 38, and they were under no stress. One object of my method is to induce tensional stresses of a high order in bars 38, and this result is accomplished in the following manner:

When material 39 completely fills space 37 in the initial stages of my process, material 39 becomes very dense and hard, and were it not for the vibrations induced by mechanisms 33, the material would become immovable. But the vibrations induced by mechanisms 33 cause the material 39 to remain for the time being, slightly plastic. As the high pressure steam is admitted through valve 9 into space or chamber 40, thereby expanding the walls of form 13, pressure is induced into material 39, and due to the release of entrapped air and surplus lubricating water, the inner surface 41 of material 39 increases in diameter and therefore in circumference. This increase in circumference is distributed through the mass of material 39 until the outer surface 42 of material 39 is reached. During this movement, the bars 38 are also caused to increase in circumference due to the expanding action of the adjacent material 39, and in the sequence of the described events, bars 38 acquire a high degree of tension, which is utilized later to offset internal bursting stresses in the pipe 43 due to carriage of fluids at high pressures.

When a stage has been reached in which further vibration produces no beneficial results upon material 39, mechanisms 33 are rendered inoperative. Pressure and heat from high pressure and hot steam in chamber 40 are continued to be exerted upon material 39, until the chemical reactions in the cementitious constituent of material 39 are sufficiently advanced. Thereupon the valve 9 is closed and the surplus high pressure steam is evacuated through valve 6. The top closure 29 is removed, and the form 22 and liner 32 (if originally utilized) are removed from the pipe 20, which is then stripped from form 13 and pipe 20 is then ready for use as a pressure conduit. Reinforcement bars 38 have remained in a state of high tension, exerting a high unit compressive force circumferentially in walls 41 of pipe 20, and I arrange the steps of my method so that at the maximum internal pressure to which the pipe 20 is subjected in use, the effect upon the concrete wall of the pipe is only to reduce the compression induced by the reinforcement bars 38, and thereby I obviate the tendency of the walls to stretch and crack, as would occur in pipe not so treated.

I provide a modification of the foregoing process by constructing the outer form 22 of Figure 1 of a material which may be expansible, as when made of rubber and fabric, on the order of a casing for a pneumatic tire. Such a structure is only comparatively elastic, and its expansibility is controlled by the strength and number of layers of fabric incorporated into it. When pressure is applied in the chamber 40, the wall 13 expands as heretofore described, compressing the material 39 which in turn causes any desired degree of expansion of the form 22, thereby greatly increasing the tensional stresses in the reinforcing material 38, at the completion of the practice of my method.

In Figure 1 I have indicated the manufacture of what is known in the trade as "bell-and-spigot" pipe. In Figure 3 I show two lengths 44 and 45 joined in the conventional manner. The spigot 46 of length 44 is inserted in bell 47 of length 45, and the space 48 between them is filled with proper caulking material 49 which is assisted in remaining in position by groove 50 formed by rib 15 on the bell 16 of form 13.

It will be clear that my method may be practiced with forms which omit the bell.

*Apparatus of Figure 3*

In Figure 3 I show another form of my apparatus, intended for the manufacture of machine-gun emplacements. The apparatus is generally similar to the apparatus of Figure 1, the base plate 1$^a$ has the raised peripheral flange 12$^a$ with the inwardly opening channel 11$^a$. The inner expansible form 13$^a$ has at the bottom the outer flange 14$^a$ received in the channel 11$^a$. The form 13$^a$ has the domed or other desired shape of top 19$^a$, and form 22$^a$ rises from plate 1$^a$ as an exterior dome 60 ending in vertical cylindrical portion 61 terminating in flange 27$^a$.

Form 22ᵃ has holes 31ᵃ and a lower flange 24ᵃ secured to plate 1ᵃ as by bolts 23ᵃ.

Closure 29ᵃ has the lower curved surface 62 conforming to the dome 60, and is provided with the central pervious but rigid plug 63 to permit the egress of water and air but not palpable particles of material 39.

The process of treating material 39 of Figure 3 is similar to the process described for Figure 1.

Vibrators 33ᵃ corresponding to those already described are similarly mounted, and steam supply pipes and valves 3ᵃ, 5ᵃ, 7ᵃ, 8ᵃ, 10ᵃ, 4ᵃ, 6ᵃ and 9ᵃ are arranged as before explained.

For the formation of machine-gun emplacements, it is desirable to provide one or more openings 64 as indicated in Figure 6, and this is accomplished by attaching a male form 65 to wall 60 by suitable fastenings 66, permitting fastenings 66 to be detached from form 65 when it is desired to remove form 22, and allowing form 65 thereupon to be removed from the formed opening 64.

For purposes of camouflage I prefer to form the outer surface of object with the appearance of a boulder or other natural formation, and to accomplish this I construct the form 22 with any suitable interior conformation, by means of which I produce the object having the desired external appearance.

Apparatus of Figure 4

In Figure 4 I show another form of my apparatus. I provide the base plate 1 in which I provide the socket 125 into which I seat the end 126 of the tubular form 127 having the closed end 128 at elevation 18. Into socket 125 I lead the steam conduit 3 attached at opening 2. I also provide the outer form 22 having the lower outwardly extending flange 24 attached to plate 1 by fastenings 23, the upper end 27 of form 22 at approximately the same level as elevation 18. I provide the member 129 having the downwardly extending annular ring 130 fitting within and closing space 37 between form 127 and form 22, ring 130 being movable within space 37. On base plate 1 I provide the ears 131 with pin 132 engaging tension rod 133 at the other end of which I provide the pin 134 engaging the end 135 of lever 136. In lever 136 I provide the pin 137 engaging ears 138 of member 129, and at the end 137 of lever 136 I provide the weight 139, slidably engaging lever 136. In form 22 I provide the orifices 31. I also provide the vibratory mechanisms 33 attached to plate 1 and to form 22, and similar mechanisms 33 may be attached at other locations on my apparatus.

In the practice of my method, I place the concrete or other material 39 in space 37, simultaneously operating vibrator mechanisms 33, until space 37 is filled to elevation 18 with material 39, from which all surplus water and entrapped air have been expelled to the extent permitted by this phase of my method. I have also admitted steam or other heated gas through pipe 3 to space 40 in form 127, thereby raising the temperature of material 39. I then bring member 129, which until now has been sufficiently remote from end 128, over form 127, with the surface 140 of ring 130 in contact at elevation 18 with material 39, and allow the weight 139 through lever 136 to exert any desired pressure upon material 39. Continuing to vibrate material 39, and continuing to supply heated gas through pipe 3, the lower face 140 of ring 130 lowers the elevation 18 of material 39 to depressed elevation 141 by reason of the pressure exerted upon material 39 which is made plastic by vibrator mechanisms 33, the remaining entrapped air and surplus water being expelled from material 39 through orifices 31.

When maximum compaction of material 39 has been attained, I terminate the actuation of vibrators 33, and continue the supply of hot gases through pipe 3 into space 40, thereby still increasing the temperature of material 39, and maintain this condition until material 39 has attained any desired degree of hardness or strength.

Thereupon, I remove the ring 130, cease the supply of hot gas through pipe 3, strip the form 22 from the exterior of material 39, and remove the form 127 from the interior of material 39, which has now become a usable conduit or hollow object.

I have found that when the material containing cementitious matter has been vibrated and subjected to pressure for a suitable interval, it becomes stabilized. When I have brought the material into this stabilized condition, the particles of the mixture no longer move relatively to each other when vibrated, and are not moved about by minor increments in applied pressure. When the material reaches this condition I have found it usually advisable to cease the application of vibrations and additional pressure, and, while holding the pressure approximately constant, to increase the temperature of the material to expedite initial setting or hardening thereof. I may, however, increase both the temperature and the pressure in a manner that will not disturb the relative positions of the particles of the material, thereby permitting the material to remain stabilized.

I claim as my invention:

1. In an apparatus of the kind described, an outer hollow form member having end closure elements at least one of which is removable, an inner hollow flexible form member having one closed end and having the other end closed by a closure element of the first member, and means for supplying fluid under pressure to the inside of the second member.

2. A form for making machine gun emplacements or the like, having an outer dome-shaped rigid perforated form member, a spaced inner dome-shaped flexible form member, a common end for the members, and means for supplying fluid under pressure to the inner member through the common end.

3. A form for making machine gun emplacements or the like, having an outer dome-shaped rigid perforated form member, a spaced inner dome-shaped flexible form member, a form element detachably secured to the inside of the first member and projecting to the second member to provide a port-hole, a common end for the members, and means for supplying fluid under pressure to the inner member through the common end.

4. A form for making machine gun emplacements or the like, having an outer perforated dome-shaped form member, a spaced inner dome-shaped flexible form member, form means for providing a port-hole in the emplacement being made, a common end for the members, said end and said inner member having co-acting interlocking parts, and means for subjecting the inner member to fluid pressure.

5. A form for making machine gun emplacements or the like, comprising an outer rigid dome-like form, an inner flexible form adapted to take a dome-like shape when expanded, means for closing the second form at the bottom thereof, means for supplying fluid under pressure to the inside of the inner form and a removable end member in the top of the first form.

6. The art of making machine gun emplacements or the like, comprising the pouring of concrete between an outer rigid perforated dome-like form, having a top opening and an inner flexible dome-like form having a closed bottom, while simultaneously subjecting the inner form to pressure on the inside, closing the opening in the top of the first form when the space between the forms is full of concrete and then subjecting the interior of the second form to heat and pressure.

7. The art of making machine gun emplacements or the like, comprising the pouring of concrete between an outer rigid perforated dome-like form, having a top opening and an inner flexible dome-like form having a closed bottom, while simultaneously subjecting the inner form to pressure on the inside, and subjecting the material between the forms to vibration, closing the opening in the top of the first form when the space between the forms is full of concrete and then subjecting the interior of the second form to heat and pressure.

ROBERT WILLIAM BAILY.